United States Patent [19]

Aguilar

[11] Patent Number: 5,063,369
[45] Date of Patent: Nov. 5, 1991

[54] AUTO THEFT ALARM

[76] Inventor: Alfonso Aguilar, 904 Bolivia, El Paso, Tex. 79903

[21] Appl. No.: 563,302

[22] Filed: Jul. 27, 1990

[51] Int. Cl.⁵ .............................................. B60R 25/10
[52] U.S. Cl. .................................. 340/429; 340/665; 340/683; 340/686; 340/689
[58] Field of Search ............... 340/429, 689, 686, 665, 340/683

[56] References Cited

U.S. PATENT DOCUMENTS

| | | | |
|---|---|---|---|
| 3,914,738 | 10/1975 | Hager | 340/429 |
| 4,040,008 | 8/1977 | Sanabria | 340/429 |
| 4,204,100 | 5/1980 | Reichert | 340/429 |
| 4,356,364 | 10/1982 | Soto | 340/429 |

Primary Examiner—Donnie L. Crosland

[57] ABSTRACT

A fail safe auto theft alarm includes a sound maker coupled to a complex switch includes a plurality of switches in series. One switch can deactivate the alarm. An activation switch is coupled to the shock absorber so that the alarm is activated only by motion up and down of the auto such as occurs during driving. A delay can prevent activation by single impacts. A pulser can generate an alarm unique to stolen autos. The switch is activated during theft by a rod coupled to the rear shock, then up into the trunk to activate the switch. The switch deactivation switch may be hidden on the dash panel of the auto.

3 Claims, 1 Drawing Sheet

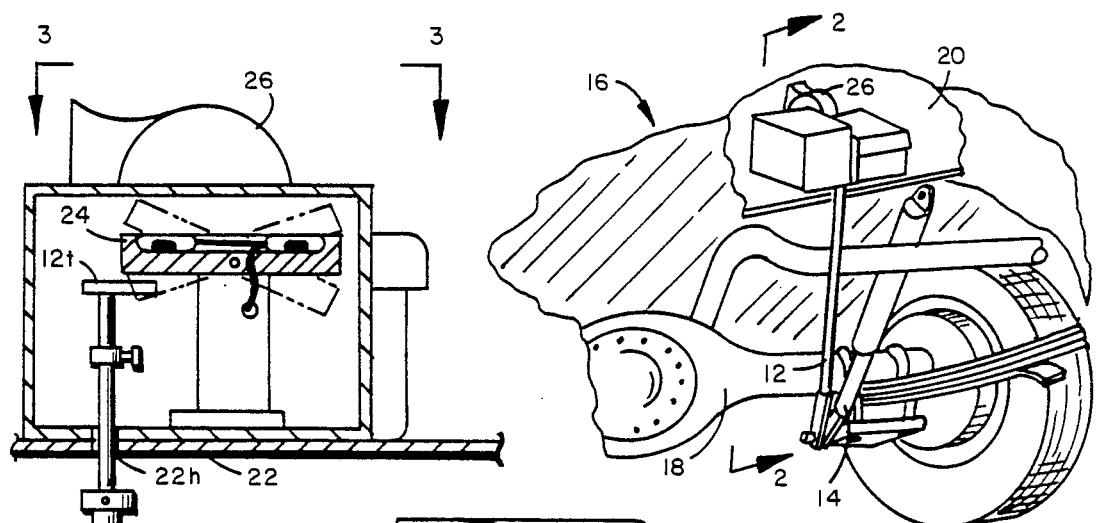
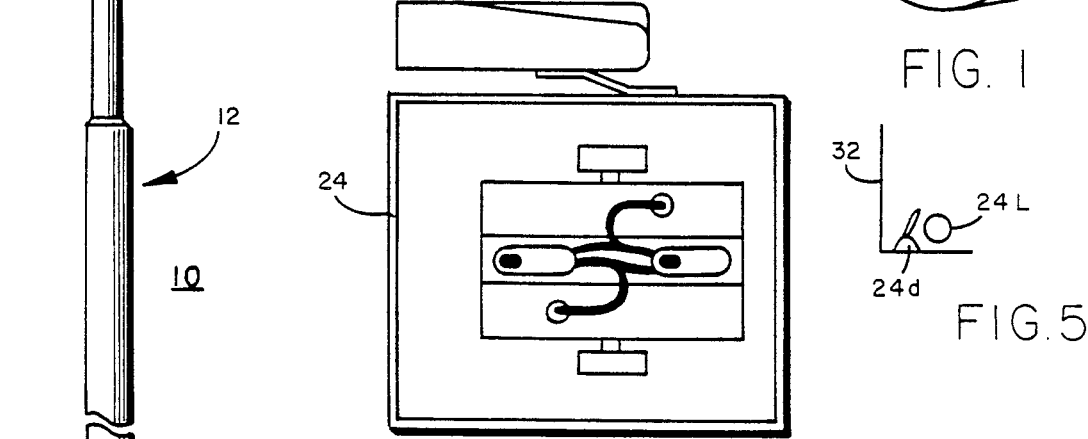
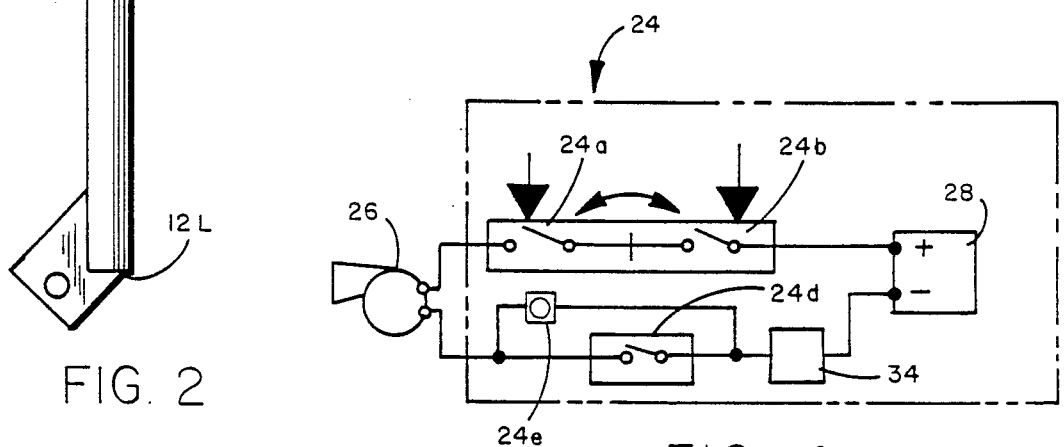

AUTO THEFT ALARM

BACKGROUND OF THE INVENTION

1. Field of the Invention

The present invention relates to auto theft alarms, particularly to fail safe auto theft alarms which do not go off unless the car is actually moving without the alarm having been turned off.

2. Description of the Prior Art

Motion detectors have been coupled to alarms to make auto theft alarms for many years. They suffer from a defect which reduces their value. They are too sensitive. The slightest touch causes an alarm. We have all heard hundreds, perhaps thousands of auto alarm signals when the car was obviously not being stolen, so we ignore them. What is needed is an auto theft alarm which activates only when conditions more closely approximate the theft of a car, so that we will not have thousands of false alarms for every theft. In addition to all the false alarms, auto thieves have learned how to disconnect car alarms, and many thefts occur in spite of the alarm. The alarm goes off, but the thief then disconnects the alarm and steals the car. What is also needed is an alarm that could be hidden in a hard to get to place such as the trunk.

SUMMARY OF THE INVENTION

A fail safe auto theft alarm system is presented. A rod lower end is coupled to a rear shock absorber by coupling means directly or via some other part of a car such as the axle which in turn is coupled to the shock absorber. The bottom surface of the trunk defines a hole through which the top part of the rod protrudes from the shock absorber area to enter the trunk. The top of the rod is coupled to a switch means such as a mercury switch. A time delay switch coupled in series to the mercury switch may prevent activation until the rod is vibrated up and down a selected length of time to make the alarm essentially fail safe.

If the switch is activated and the car is parked, nothing happens and no alarm noise is generated. If the car is then moved without deactivating the switch, the rod is moved up and down by motion of the shock absorber or other part coupled thereto such as the axle. Movement of the rod up and down causes the switch to activate a sound maker. The power source for the switch and sound maker can be the car battery or any other selected source such as a second battery in the trunk.

In operation, When the driver wishes to drive, he deactivates the switch. When he wishes to activate the alarm, he activates the switch. The switch comprises a disconnect switch in parallel with an activation switch. The sound maker can be activated only if current can flow through the switches to power the sound maker. Opening any switch deactivates the alarm so the car can be driven without alarm noise. Closing all switches permits current from the current source to drive the sound maker. Mercury switches are well known to the prior art. If the switches close to conduct current therethrough, the current activates the sound maker. To differentiate from cars with jammed horns, a prior art pulser interrupts the current in a predetermined sequence so that the activated sound maker generates a preselected sound sequence. The switch used to activate the alarm can, of course, be a combination or key lock. Delay by the timer makes the alarm essentially fail safe, since accidental bumps would not last long enough to permit the timer to permit current flow to the sound means which may be the auto horn.

DRAWING DESCRIPTION

Reference should be made at this time to the following detailed description which should be read in conjunction with the following drawings of which:

FIG. 1 is a ¾ cut away view of a portion of an auto containing the invention;

FIG. 2 is a side view of the invention;

FIG. 3 is a view of the switch of the invention;

FIG. 4 is a schematic view of the invention; and

FIG. 5 is a view of the switch on the dash panel of the auto.

DETAILED DESCRIPTION OF THE INVENTION

Reference should be made at this time to FIGS. 1–4. A fail safe auto theft alarm system 10 is presented. A rod 12 lower end 12L is coupled to a rear shock absorber 14 directly or via some other part of the car 16 such as the axle 18 which in turn is coupled to the shock absorber 14. The bottom surface 22 of the trunk 20 defines a hole 22h through which the rod 12 protrudes to enter the trunk 20. The top 12t of the rod 12 is coupled to a switch means 24 such as a mercury switch 24.

If the switch 24 is activated and the car 16 is parked, nothing happens and no alarm noise is generated because switch 24 is not activated because switch 24a is not activated. If the car 16 is then moved without deactivating the switch 24 via switch 24d, the rod 12 is moved up and down by motion of the shock absorber 14 or other part coupled thereto such as the axle 18. Movement of the rod 12 up and down causes the switch 24a to activate, thereby causing switch 24 to activate a sound maker 26. The power source 28 for the switch 24 and sound maker 26 can be the car battery 28 or any other selected source such as a second battery 28 in the trunk.

In operation, when the driver (not shown) wishes to drive, he deactivates the switch 24 by opening switch 24d. When he wishes to activate the alarm, he activates the switch 24 by closing switch 24d. The switch 24 comprises a disconnect or deactivate switch 24d in series with an activation switch 24a. As best shown in FIG. 4, the sound maker 26 can be activated only if current can flow through switches 24d and 24a to power the sound maker 26. Opening switch 24d deactivates the alarm 10 so the car 16 can be driven without alarm noise. Closing switch 24d permits current from source 28 to drive sound maker 26 if switch 24a and the other internal switches of overall switch 24 also close. The switch 24d should be in an unobvious place in the car such as under the dash panel 32 for easy access not obvious to a thief. A delay timer 34 may keep the alarm off for a selected period of time after activation and may illuminate a warning such as a light 24L on the dash panel or a sound alarm inside the car such as the seat belt alarm (not shown). The alarm 10 may be deactivatable by a combination or other type of lock 24b. FIG. 4 shows a partial mercury switch schematic. Such switches are well known to the prior art. Pulser 24e is shown to give another option to energize overall switch 24 in a predetermined pattern to give a pulsed alarm different from other street noises. If all internal switches 24a, 24d and 24b close, current flows through switch 24 activating sound maker 26. To differentiate from cars with jammed horns and other horn like sounds, the pulse means 24e, which is also referred to herein as prior art pulser 24e, can be utilized to interrupt the current in a predetermined sequence so that the activated sound maker 26 generates a preselected sound sequence unique to stolen cars being driven and unlike other horn, alarm or street sounds.

A particular example of the invention has been disclosed herein. Other examples will be obvious to those skilled in the art. The invention is limited only by the following claims.

I claim:

1. A fail safe auto theft alarm system, comprising:

a rod having a top and a lower end;

rod to shock absorber coupling means coupling the lower end of the rod to a rear shock absorber of an auto wherein the auto has a trunk having a bottom surface;

a sound maker;

the bottom surface of the auto trunk defines a hole therethrough through which hole the top of the rod is coupled to a switch means that actuates the sound maker, and the rod is coupled to the shock absorber by shock absorber coupling means, the switch means comprising two switches in series, a first switch and a second switch, the rod is moved up and down by motion of the shock absorber when the auto is moving, so that movement of the rod up and down causes the first switch of the switch means to close, thereby permitting activation of the sound marker only if the second switch is also closed, and wherein the second switch is opened and closed manually to activate and deactivate the fail safe auto theft alarm system; and a power source capable of generating power which power is transmitted through the two switches of the switch means when both switches are closed to activate the sound maker.

2. The invention of claim 1, further including pulse means capable of generating a preselected series of pulses, coupled in series with the two switches such that closing of the switches to activate the sound maker causes the sound maker to utilize the pulses from the pulse means to generate a preselected sound pulse, and wherein the second switch is opened and closed manually by means of a lock system.

3. The invention of claim 2 wherein a timer delays activation of the sound maker so the sound maker can be activated only by shock absorber motion in duration in excess of a preselected duration and the alarm is coupled to the shock absorber via the rear axle of the car.

* * * * *